Feb. 7, 1939.  E. C. HORTON  2,146,214
MOTOR VEHICLE
Filed April 12, 1935   2 Sheets-Sheet 1

INVENTOR
Erwin C. Horton,
BY
Beau, Brooks, Buckley & Beau.
ATTORNEYS

Feb. 7, 1939.  E. C. HORTON  2,146,214
MOTOR VEHICLE
Filed April 12, 1935  2 Sheets-Sheet 2
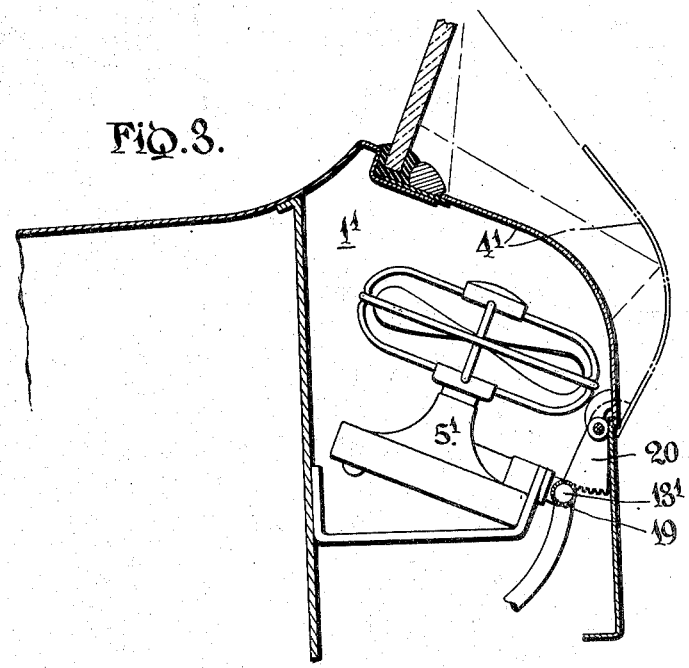
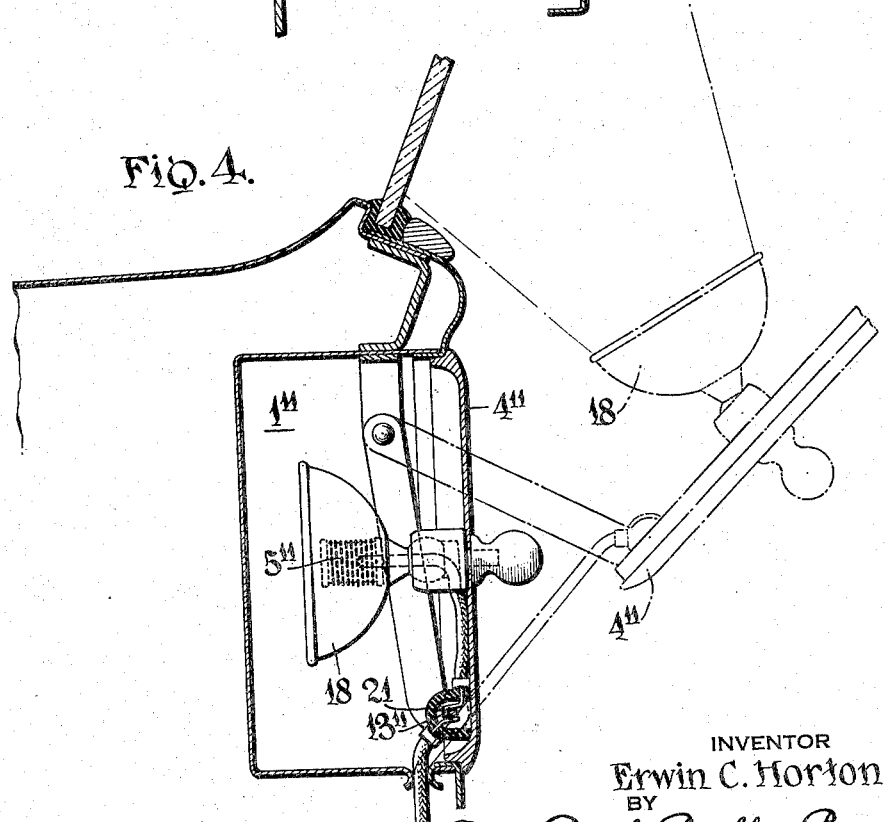
INVENTOR
Erwin C. Horton,
BY
Beau, Brooks, Buckley & Beau.
ATTORNEYS Patented Feb. 7, 1939

2,146,214

UNITED STATES PATENT OFFICE 2,146,214

MOTOR VEHICLE

Erwin C. Horton, Hamburg, N. Y., assignor to Trico Products Corporation, Buffalo, N. Y.

Application April 12, 1935, Serial No. 16,080

7 Claims. (Cl. 20—40.5)

This invention relates to a motor vehicle and has particular reference to means for increasing the comfort and safety of the motorist while operating the vehicle.

In certain kinds of weather moisture will condense on the windows and obscure vision therethrough. This is due primarily to the difference in temperature between the closed interior and the outside atmosphere, and especially in winter it is difficult to keep the windows free from frosting. Various devices heretofore have been designed to eliminate such clouding of the windows but they have been more or less portable in character and when not in use probably would be removed from the vehicle so that when it is next desired to use the device the same would not be at hand.

The present invention has for its object to embody window clearing and cleaning means in the body fabrication of the vehicle which may readily be concealed or disposed in a protected location within the vehicle when it is not desired to use such device, and at the same time always have the same readily accessible for use when the occasion demands the same. The invention also has for its object to incorporate a device of this character which may be used in a manner to increase the comfort of the car passengers.

In the drawings:

Fig. 3 is a similar view depicting a modified form of the invention.

Fig. 4 is still a further embodiment of the invention.

Figure 1:
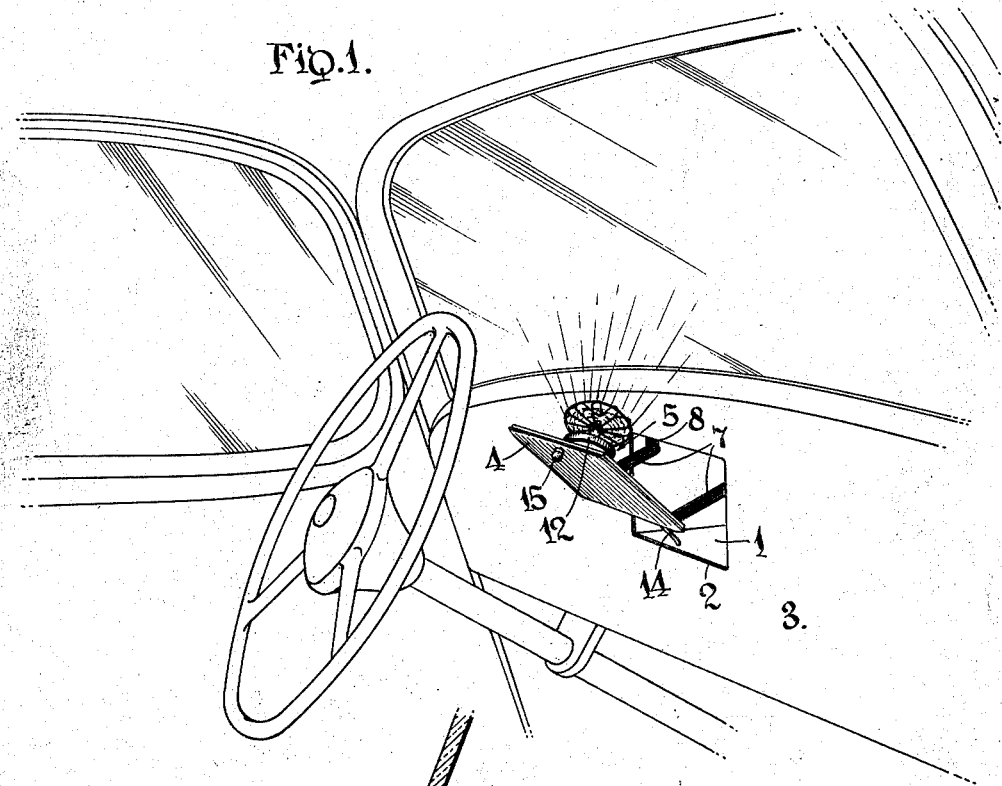
Fig. 1 is an interior and fragmentary perspective view of a motor vehicle embodying the present invention in one form.

According to the present invention the motor vehicle is provided with a passenger compartment in the front of which is a window or windshield which, during cold weather especially, becomes cloudy or covered with condensation, thereby obscuring vision therethrough. Adjacent the windshield is a chamber or space 1 which is accessible from the interior of the vehicle as through the opening 2 of the instrument board 3, or other trim or finishing member of the vehicle. The compartment is provided with a closure or door 4 and is utilized to normally house and protect a device 5 especially adapted for the elimination of moisture condensation on the windows.

Figure 2:
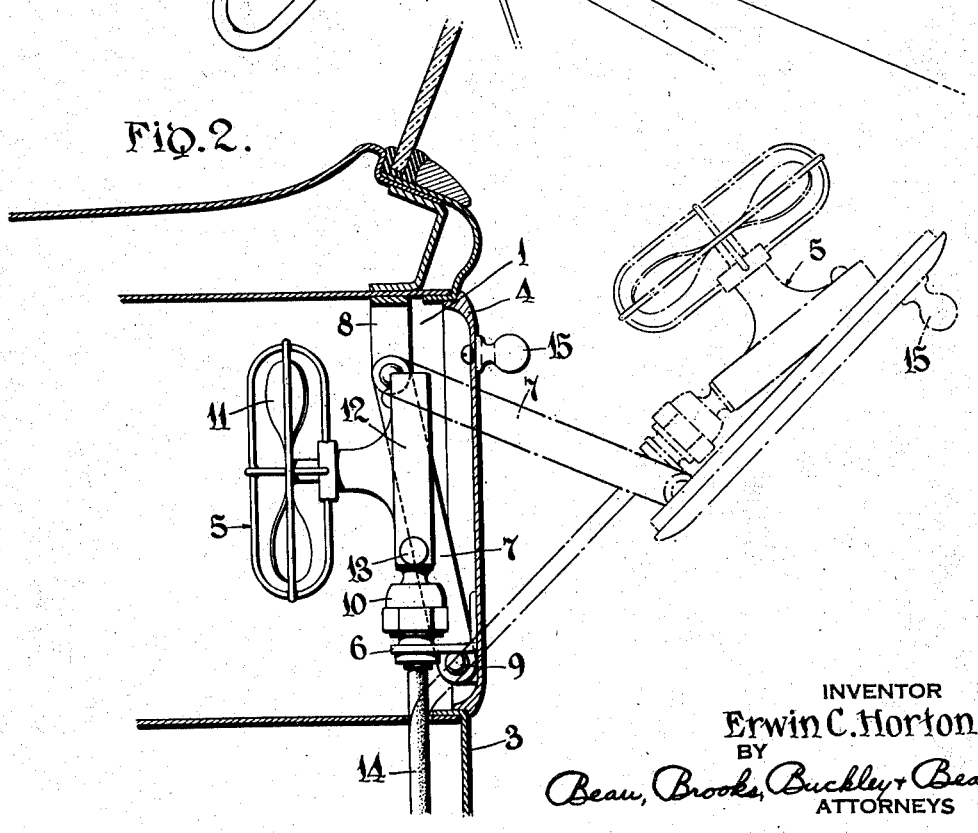
Fig. 2 is a fragmentary sectional view through the construction depicting more clearly the present invention.

In Figs. 1 and 2, such condensation removing or eliminating device is mounted for being withdrawn to an operative position by and during opening movement of the closure 4. To this end, and by way of illustration, a bracket 6 is attached to the inner face of the door 4 and supports the device thereon so that when the door is moved to an open position the device will be disposed in such manner as to act directly upon the adjacent window.

In order to provide more accurate disposition of the condensation removing device, the door may be hingedly connected to the body of the vehicle by a pair of swinging links 7, the same being pivoted at one end to a mounting bracket 8 and at the opposite end to the door, as indicated at 9. The hinge joints will be sufficiently tight to provide the necessary friction for holding the door at various set adjustments. Such mounting of the door permits bodily movement of the latter to and from its open position and enables the door to be moved outwardly from the compartment a sufficient distance to better focus or direct the action of the device on the adjacent window.

To increase the flexibility in the mounting of the device the latter is provided with an independent adjustment such as a ball and socket mounting 10 so that if the device has been moved to its operative position by the opening of the door, minor adjustment of the device, independently of the hinged door, may be effected for directing the same to act upon a predetermined area or zone of the window. For instance, in referring particularly to Fig. 2, the condensation removing device has been tilted backwardly about its ball and socket mounting in the broken line illustration over the full line showing thereof, in which latter the device is substantially at a normal to the plane of the door. If desired, and by reason of this flexible mounting, the device may be reversed as to its location and directed toward the passengers or toward a more remote window, as may be desired.

When the use of the device is not required the door is moved to its closed position so as to dispose the device within the compartment where it will be concealed and protected until its use is again required.

Devices heretofore designed for removing or eliminating moisture from the windshields of vehicles have been of various types. Some have been electrical in operation while others have been of the blower or fan type, the functioning in each instance being primarily to create a movement of the air adjacent the window surface. In the use of the electric heating type for this purpose, the heated layer of air adjacent the windshield absorbs a certain amount of moisture of condensation and moves off as the air circulation begins. In the case of a fan projecting an air blast across the window surface, the warmer air is directed over the window surface for absorbing the moisture and carrying it away. The device 5 may be of any approved type for accomplishing the desired purpose. For the sake of illustration, the device 5 is depicted as being in the form of a motor driven fan having propeller blades 11 driven by a motor 12, the speed of which is controlled by a shut-off 13 placed at a suitable point in the power line 14. The motor may be electrically driven or it may be operated by fluid pressure and if operated by air pressure the same may be connected to the intake manifold of the motor vehicle engine as a source of low pressure, as an ideal installation. A device embodying the latter principle of operation is shown in Patent No. 1,745,114 granted to John R. Oishei and Henry Hueber on January 28, 1930.

In operation, it is simply necessary to grasp the door knob 16 and pull the door out to its open position such as is indicated in the broken line showing in Fig. 2 and the full line showing in Fig. 1. This disposes the device in a major position for directing its action against the window. If it is desired to give the device a minor adjustment independent of the door, either up or down or laterally or even in a reverse location, the same may be readily accomplished by reason of the ball and socket mounting. Obviously the power line 14 will feed outwardly through the opening 2 when the door is opened and will automatically retract when the door is closed. When the use of the device is to be discontinued, it is simply necessary to move the door to a closed position.

In the embodiment depicted in Fig. 3, the device is caused to act on the window in an indirect manner. The device 5' is given a fixed mounting in the compartment 1', and the closure 4' is so arranged in the current or shaft of air from the fan as to deflect it against the window. The closure may be adjusted to regulate or direct the air current more or less fully against a particular portion of the window, or it may be fully opened to permit the breeze to move rearwardly toward the passengers in the vehicle.

Fig. 4 illustrates an electrical heater 5" having a reflector 18 for directing a shaft of heat against the window, the unit being adjustably mounted on the closure 4" for movement therewith. The reflected shaft of heat will cause a movement of a current of air across the window surface for readily removing the moisture therefrom.

All three forms of the invention may be provided with manual controls for the defrosting devices, like the hand valve 13 in Fig. 2 or the automatic valve 13' in Fig. 3, such automatic valve having a pinion 19 meshing with a rack 20 which is operated by the closure 4' so that when the closure is shut, the valve will be closed, and vice versa. In Fig. 4 a bridging contact member 13" is connected to the closure hinge so as to be moved thereby when the closure is opened to bridge the gap between the spring contacts 21 and thereby close the circuit to the heating element 5". It will be apparent that when the closure is moved to a position for closing the compartment 1", the circuit will be broken and the heater de-energized and when the closure is moved to an open position, the heater will be energized automatically to accomplish the defrosting operation. Obviously the hand control valve 13 may be changed to an automatic control by substituting the automatic valve 13' of Fig. 3 or an equivalent construction adapting the automatic feature to the supporting linkage for the closure.

In Figs. 1, 2 and 3, the door provides a unique support for the device so that by a simple manipulation the device may be moved to and from its concealed position and will always be readily accessible and at the same time, when in the compartment, will be safely housed and protected until further use. In Fig. 3, the door likewise, when opened, will dispose the device operative to act upon the window. The use of the term "fan" in the appended claims will, therefore, obviously include other means for directing or reflecting heat against the window, or otherwise act thereon, to remove moisture therefrom. Furthermore, the expression "current of air" will comprehend the shaft of heat emanating from the device of Fig. 4.

What is claimed is:

1. A motor vehicle having a passenger compartment with a window and an opening in an adjacent trim member, the combination with the trim member, of means mounted within the trim member and adapted to be removed through the opening thereof to a position in front of the trim member to act upon the window surface in removing condensation therefrom, and means mounting said first means for bodily concealment within the trim member.

2. In a motor vehicle having a passenger compartment with a window and an adjacent trim member formed with an opening leading into a chamber therein, a closure for the chamber, means mounting the closure for adjustment, a fan carried at the inner side of the closure and positionable thereby to direct a current of air against the window, and means for adjusting the fan independently of and on the adjustable closure.

3. In a motor vehicle having a passenger compartment with a window and an adjacent body trim member provided with an opening leading into a chamber, a closure for the chamber constituting a part of the trim, and means carried at the inner side of the closure and positionable thereby to direct a medium across the window to clear the latter for vision therethrough, said means being receivable by the compartment when the closure is in its operative position.

4. A motor vehicle having a passenger compartment with a windshield and an underlying instrument board provided with an opening leading into a space behind the instrument board, a closure for the opening in the instrument board, power operated condensation removing means mounted on the closure at the inner side thereof for movement therewith to a position in front of the instrument board from which said means may act upon the windshield in eliminating moisture therefrom, and means for starting and stopping the operation of said first means when withdrawn through the opening of the instrument board to a position in front thereof.

5. A motor vehicle having a passenger compartment with a wall chamber accessible from within a passenger compartment, a closure for the chamber, means mounting the closure for bodily movement toward and from its operative position, a power operated fan carried by the closure at the inner side thereof for bodily movement therewith, and a power line leading to the fan and extensible from and retractable within he chamber, said fan being adjustable independently of the closure and receivable by the chamber when the closure is in its operative position.

6. A motor vehicle having a passenger compartment with a window and an adjacent body rim member provided with a chamber, means operable to create a current of air and normally concealed within the chamber but movable to an exposed position for directing the current of air within the passenger compartment against the window, and a closure for the chamber connected to the first means for moving it to such position when the closure is opened.

7. In a motor vehicle having a passenger compartment with a window, first means for creating a circulation of air over the inner surface of the window to free the latter from moisture of condensation, and second means adjustable and selectively rendering the first means operative to direct the circulation of air onto the window or inoperative to discontinue such circulation of air, said second means concealing and closing off the first means from communication with the window when said first means is in an inoperative position.

ERWIN C. HORTON.